(12) United States Patent
Kerschbaumer

(10) Patent No.: US 12,233,986 B2
(45) Date of Patent: Feb. 25, 2025

(54) BRAKING ASSEMBLIES AND METHODS OF MANUFACTURE AND USE THEREOF

(71) Applicant: Michael Robert Kerschbaumer, New York, NY (US)

(72) Inventor: Michael Robert Kerschbaumer, New York, NY (US)

(*) Notice: Subject to any disclaimer, the term of this patent is extended or adjusted under 35 U.S.C. 154(b) by 0 days.

(21) Appl. No.: 17/680,182

(22) Filed: Feb. 24, 2022

(65) Prior Publication Data

US 2022/0266944 A1 Aug. 25, 2022

Related U.S. Application Data

(60) Provisional application No. 63/153,470, filed on Feb. 25, 2021.

(51) Int. Cl.
*B62L 3/02* (2006.01)

(52) U.S. Cl.
CPC .............. *B62L 3/026* (2013.01); *B62L 3/023* (2013.01)

(58) Field of Classification Search
CPC ......... B62L 3/026; B62L 3/023; B62K 21/12; B62K 11/14; B62K 21/26; B62K 23/04; B62K 23/06; B63H 21/213
See application file for complete search history.

(56) References Cited

U.S. PATENT DOCUMENTS

| 9,567,034 | B2 | 2/2017 | Sirbu | |
|---|---|---|---|---|
| 2006/0266595 | A1* | 11/2006 | Nago | B60T 11/165 |
| | | | | 188/24.22 |
| 2007/0266817 | A1* | 11/2007 | Lassiter | B62K 21/26 |
| | | | | 74/551.8 |
| 2016/0318578 | A1 | 11/2016 | Heber et al. | |
| 2017/0190335 | A1 | 7/2017 | Gillett | |
| 2018/0229697 | A1 | 8/2018 | Ostini et al. | |
| 2019/0375480 | A1* | 12/2019 | Pankratz | B62J 45/41 |
| 2022/0073168 | A1* | 3/2022 | Kerschbaumer | B60T 11/22 |
| 2024/0157193 | A1* | 5/2024 | Stearns | A63B 22/0056 |

FOREIGN PATENT DOCUMENTS

| CN | 2052385 | U | | 2/1990 | |
|---|---|---|---|---|---|
| CN | 2139920 | Y | * | 8/1993 | ............... B62L 3/02 |
| CN | 2145748 | Y | * | 11/1993 | ............... B62L 3/02 |
| CN | 2521135 | Y | * | 11/2002 | ............ B62K 21/00 |
| CN | 107117246 | A | * | 9/2017 | ............ B62K 21/12 |
| DE | 202010010459 | U1 | * | 10/2010 | ............... B62L 3/02 |
| DE | 202014008869 | | | 1/2015 | |
| KR | 202008005038 | | | 10/2008 | |

(Continued)

OTHER PUBLICATIONS

Machine translation of DE 202010010459 U1, Blatt, Oct. 14, 2010 (Year: 2010).*

(Continued)

*Primary Examiner* — Vinh Luong
(74) *Attorney, Agent, or Firm* — Dentons US LLP

(57) ABSTRACT

Various technologies for reducing or increasing a speed of a personal transportation vehicle by rotating its handlebar. Some technologies provide this functionality based on a stem, a rack, and a brake. Some technologies provide this functionality based on a worm gear, a stem, and a brake. Some technologies provide this functionality based on a cam, a cam follower, a rod, a stem, and a brake.

20 Claims, 8 Drawing Sheets

(56) References Cited

FOREIGN PATENT DOCUMENTS

| KR | 20100012067 | 2/2010 | |
|---|---|---|---|
| WO | WO199014974 | 12/1990 | |
| WO | WO 2013000780 A1 * | 1/2013 | ............. B60T 11/04 |
| WO | WO 2016042431 A2 * | 3/2016 | ............. A61G 5/101 |
| WO | WO2018154209 | 8/2018 | |
| WO | WO 2020096883 A1 * | 5/2020 | ............. B60T 11/04 |
| WO | WO 2020227348 A1 * | 11/2020 | ................ B62L 3/02 |
| WO | WO 2022130118 A1 * | 6/2022 | ............. B60T 8/172 |

OTHER PUBLICATIONS

Machine translation of WO 2013000780 A1, Hujer, Jan. 3, 2013 (Year: 2013).*
Machine translation of CN 2521135 Y, Dai, Nov. 20, 2002 (Year: 2002).*
Translation of CN 2145748 Y, Han et al., Nov. 10, 1993 (Year: 1993).*
Translation of CN 107117246 A, Kong, Sep. 1, 2017 (Year: 2017).*
Translation of CN-2139920-Y, Deng, Aug. 11, 1993 (Year: 1993).*
International Search Report and Written Opinion dated Feb. 25, 2020 for International Application PCT/US19/59340 filed Nov. 1, 2019 (9 pages).
International Search Report and Written Opinion dated Aug. 20, 2020 in related application PCT/US20/31576 filed May 6, 2020 (8 pages).

* cited by examiner

BRAKING ASSEMBLIES AND METHODS OF MANUFACTURE AND USE THEREOF

CROSS-REFERENCE TO RELATED PATENT APPLICATION

This patent application claims a benefit of U.S. Provisional Patent Application 63/153,470 filed 25 Feb. 2021; which is incorporated by reference herein in its entirety for all purposes.

TECHNICAL FIELD

This disclosure pertains to various methods and various apparatuses for controlling various braking mechanisms for various personal transportation vehicles, such as bicycles, motorcycles, scooters, or others.

BACKGROUND

Currently, bicycle hand-braking systems rely on levers which actuate the bicycle's cable or a hydraulic braking system. When actuated, the brake lever utilizes the movement of a cable or a hydraulic fluid to transfer a mechanical force or energy to the rest of the braking system. In response, the braking system actuates brake pads configured to exert force upon (e.g., squeeze) a rim of a bicycle wheel, tire, drum, hub or brake disc. Conventionally, the brakes cables or the hydraulic braking system are actuated using brake levers installed on or near the bicycle's handlebar. However, these approaches do have a few inefficiencies. For instance, actuating the brake levers has been proven difficult for riders with small or weak hands (e.g., children or the elderly).

SUMMARY

In some embodiments, a device comprises: a handlebar having a longitudinal axis; a circular gear radially extending from the handlebar; a moveable rack meshing with the circular gear; a stem engaging the handlebar such that the handle bar rotates about the longitudinal axis relative to the stem; and a brake configured to be actuated in response to the moveable rack engaging a hydraulic, cable, or other mechanical braking mechanism housed in or operably connected to the stem based on the circular gear being rotated via the handlebar.

In some embodiments, a device comprises: a handlebar having a longitudinal axis; a circular gear radially extending from the handlebar; a worm gear meshing with the circular gear; a stem engaging the handlebar such that the handle bar rotates about the longitudinal axis relative to the stem; and a brake configured to be actuated in response to the worm gear engaging a hydraulic, cable, or other mechanical braking mechanism housed in or operably connected to the stem based on the circular gear being rotated via the handlebar.

In some embodiments, a device comprises: a handlebar having a longitudinal axis; a cam radially extending from the handlebar; a cam follower engaging the cam; a rod extending from the cam follower; a stem engaging the handlebar such that the handle bar rotates about the longitudinal axis relative to the stem; and a brake configured to be actuated in response to the cam follower or the rod engaging a hydraulic, cable, or other mechanical braking mechanism housed in or operably connected to the stem based on the cam moving via the handlebar.

DESCRIPTION OF DRAWINGS

The set of accompanying illustrative drawings shows various example embodiments of this disclosure. Such drawings are not to be construed as necessarily limiting this disclosure. Like numbers and/or similar numbering scheme can refer to like and/or similar elements throughout.

DETAILED DESCRIPTION

Figure 1:
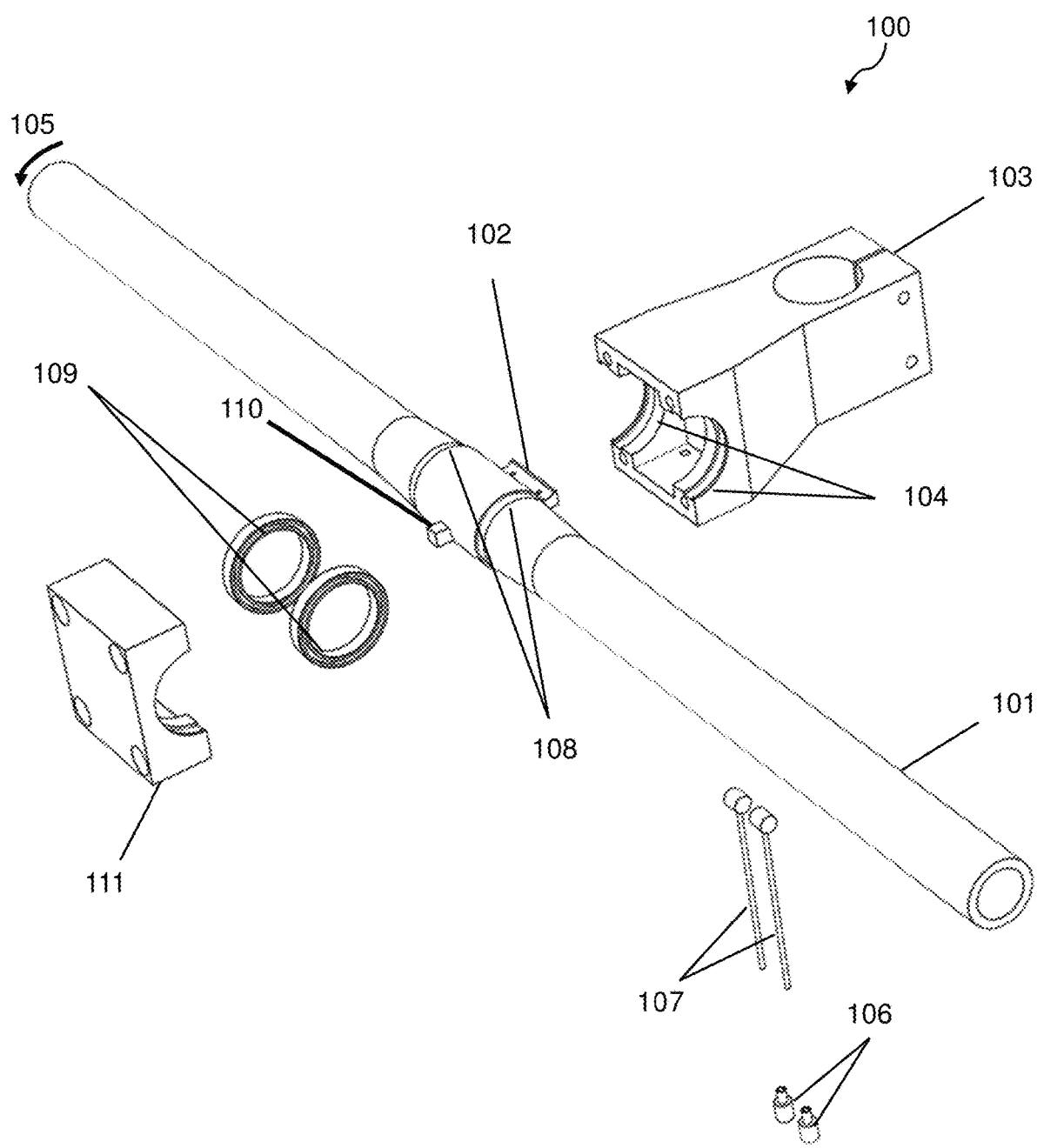
FIG. 1 illustrates an exploded view of an embodiment (first) of a rotational hand brake according this disclosure.

This disclosure is now described more fully with reference to the set of accompanying illustrative drawings, in which example embodiments of this disclosure are shown. This disclosure can be embodied in many different forms and should not be construed as necessarily being limited to the example embodiments disclosed herein. Rather, the example embodiments are provided so that this disclosure is thorough and complete, and fully conveys various concepts of this disclosure to those skilled in a relevant art.

Features described with respect to certain example embodiments can be combined and sub-combined in and/or with various other example embodiments. Also, different aspects and/or elements of example embodiments, as disclosed herein, can be combined and sub-combined in a similar manner as well. Further, some example embodiments, whether individually and/or collectively, can be components of a larger system, wherein other procedures can take precedence over and/or otherwise modify their application. Additionally, a number of steps can be required before, after, and/or concurrently with example embodiments, as disclosed herein. Note that any and/or all methods and/or processes, at least as disclosed herein, can be at least partially performed via at least one entity in any manner.

Various terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements can be present, including indirect and/or direct variants. In contrast, when an element is referred to as being "directly connected" or "directly coupled" to another element, there are no intervening elements present.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from various teachings of this disclosure.

Various terminology used herein is for describing particular example embodiments and is not intended to be necessarily limiting of this disclosure. As used herein, various singular forms "a," "an" and "the" are intended to include various plural forms as well, unless a context clearly indicates otherwise. Various terms "comprises," "includes" and/or "comprising," "including" when used in this specification, specify a presence of stated features, integers, steps, operations, elements, and/or components, but do not preclude the presence and/or addition of one or more other features, integers, steps, operations, elements, components, and/or groups thereof.

As used herein, a term "or" is intended to mean an inclusive "or" rather than an exclusive "or." That is, unless specified otherwise, or clear from context, "X employs A or B" is intended to mean any of a set of natural inclusive permutations. That is, if X employs A; X employs B; or X employs both A and B, then "X employs A or B" is satisfied under any of the foregoing instances.

Example embodiments of this disclosure are described herein with reference to illustrations of idealized embodiments (and intermediate structures) of this disclosure. As such, variations from various illustrated shapes as a result, for example, of manufacturing techniques and/or tolerances, are to be expected. Thus, various example embodiments of this disclosure should not be construed as necessarily limited to various particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing, and/or other any other types of manufacturing. For example, some manufacturing processes include three dimensional (3D) printing, laser cutting, computer numerical control routing, milling, pressing, stamping, vacuum forming, hydroforming, injection molding, lithography, and so forth.

Any and/or all elements, as disclosed herein, can be and/or include, whether partially and/or fully, a solid, including a metal, a mineral, an amorphous material, a ceramic, a glass ceramic, an organic solid, such as wood and/or a polymer, such as rubber, a composite material, a semiconductor, a nanomaterial, a biomaterial and/or any combinations thereof. Any and/or all elements, as disclosed herein, can be and/or include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, opaqueness, luminescence, reflection, phosphorescence, anti-reflection and/or holography, a photo-sensitive coating, an electronic and/or thermal property coating, such as for passivity, insulation, resistance or conduction, a magnetic coating, a water-resistant and/or waterproof coating, a scent coating and/or any combinations thereof. Any and/or all elements, as disclosed herein, can be rigid, flexible, and/or any other combinations thereof. Any and/or all elements, as disclosed herein, can be identical and/or different from each other in material, shape, size, color and/or any measurable dimension, such as length, width, height, depth, area, orientation, perimeter, volume, breadth, density, temperature, resistance, and so forth.

Unless otherwise defined, all terms (including technical and scientific terms) used herein have the same meaning as commonly understood by one of ordinary skill in an art to which this disclosure belongs. Various terms, such as those defined in commonly used dictionaries, should be interpreted as having a meaning that is consistent with a meaning in a context of a relevant art and should not be interpreted in an idealized and/or overly formal sense unless expressly so defined herein.

Furthermore, relative terms such as "below," "lower," "above," and "upper" can be used herein to describe one element's relationship to another element as illustrated in the set of accompanying illustrative drawings. Such relative terms are intended to encompass different orientations of illustrated technologies in addition to an orientation depicted in the set of accompanying illustrative drawings. For example, if a device in the set of accompanying illustrative drawings were turned over, then various elements described as being on a "lower" side of other elements would then be oriented on "upper" sides of other elements. Similarly, if a device in one of illustrative figures were turned over, then various elements described as "below" or "beneath" other elements would then be oriented "above" other elements. Therefore, various example terms "below" and "lower" can encompass both an orientation of above and below.

As used herein, a term "about" and/or "substantially" refers to a +/−10% variation from a nominal value/term. Such variation is always included in any given value/term provided herein, whether or not such variation is specifically referred thereto.

If any disclosures are incorporated herein by reference and such disclosures conflict in part and/or in whole with this disclosure, then to an extent of a conflict, if any, and/or a broader disclosure, and/or broader definition of terms, this disclosure controls. If such disclosures conflict in part and/or in whole with one another, then to an extent of a conflict, if any, a later-dated disclosure controls.

Generally, this disclosure pertains to various methods and various apparatuses for controlling various braking mechanism for various land vehicles, such as bicycles, motorcycles, scooters, or others. As noted above, conventional solutions to some abovementioned problems have proven to be less than satisfactory. Therefore, this disclosure enables a handlebar configured to rotate and use a rotational force to actuate a braking system of a personal transportation vehicle. This solution provides a mechanical advantage and a rider may use both hands, both wrists, and both forearms to rotate the handlebar instead of just a few fingers. Therefore, the mechanical advantage is significantly increased, and both front and rear brakes can be actuated using the mechanical force transferred from the rotating handlebar independently or jointly. The embodiments disclosed herein also allow the force to be applied to the front or rear wheel, in accordance with a predetermined proportion.

Furthermore, a few have attempted to utilize pedal brakes for riders with limited physical abilities by capitalizing on the larger muscles in the legs. However, pedal brakes can only actuate the rear wheel's braking system. And given that 75% of the braking power on a bicycle is generated using the front wheel, the above-mentioned solution is not ideal. On the other hand, the methods and apparatus disclosed herein allow riders to use the larger and stronger forearm muscles to create a better and more efficient braking power. Furthermore, children's kick bicycles do not have pedals making these bicycles unable to utilize a pedal brake and no brake levers as their fingers are not strong enough The methods and apparatuses disclosed herein are also safer as the fingers do not need to be moved from the grip to the lever, thus improving the rider's reaction time. Furthermore, keeping one's hands on the handlebar helps maintain control, especially over bumpy or off-road conditions.

FIG. 1 illustrates an exploded view of a rotational hand brake, in accordance with an embodiment. FIG. 1 illustrates the operational steps for manually actuating a braking system 100 in accordance with an embodiment. As illustrated in FIG. 1, a braking system 100 may include handlebar 101, cable seat 102, stem 103, bearing outer race 104, braking rotation 105, cable ferrules 106, brake cables 107, bearing inner race 108, bearings 109, bar stop 110, and stem face plate 111.

In operation, and using a non-limiting example, an operator (e.g., a rider) may use one or more components described in FIG. 1 to actuate the braking system 100 of a bicycle or another moving personal transportation vehicle. For instance, a rider may rotate the handlebar 101, in the direction of the braking rotation 105, thereby rotating the cable seat 102 in a rotational manner consistent with the braking rotation 105. The cable seat 102 may be a tab or otherwise a protrusion or receptacle that is attached with or otherwise operationally coupled with the handlebar 101, as shown in the braking system 100.

The cable seat 102 may rotate the same amounts as the handlebar 101. For instance, the speed and the rotational amount of movement of cable seat 102 may be directly proportional to the speed and the rotational amount of the handlebar 101. In some other embodiments, the speed and the rotational amount of the cable seat 102 may not be directly proportional to the speed and the rotational amount of the handlebar 101. In some configurations, cable seat 102 may rotate at a speed or by an amount that is not equal to the handlebar 101.

Furthermore, the rotation of the cable seat 102 may also be restricted by the stem 103 in which the cable seat 102 is housed. For example, upper and lower portions of the stem 103 may dictate how much the cable seat 102 can rotate in clockwise and/or counterclockwise directions.

In some configurations, the cable seat 102 may include one or more openings (e.g., holes) that correspond to brake cables 107. For instance, brake cables 107 may penetrate the cable seat 102 in accordance with these openings. The size and configurations of these holes may be directly related to the amount of force exerted on to the brake cables 107. For instance, in a non-limiting example, the amount of force exerted on to a brake cable may be reduced proportionally as a result of said brake cable's distance from the center axis of the cable seat 102. Therefore, using differing brake cables penetrating through different openings at various distances, the braking system 100 may control the proportion of force exerted on to each brake cable. Using this method, braking system 100 may regulate or balance the force exerted on to the front wheel and the back wheel.

In some configurations, the braking system 100 may be operationally connected to a balancer or a regulator that transmits, e.g., exerts, a predetermined proportion of the force (exerted onto the handlebar 101) onto the front and the back wheel.

The stem 103 may also house brake cables 107 and cable ferrules 106. The cable seat 102 maybe operationally coupled with the brake cables 107 and/or cable ferrules 106. For example, moving the cable seat 102 may actuate the brake cables 107 housed in this stem 103. In operation, the brake cables 107 may transfer the mechanical force exerted by the operator (e.g. by rotating the handlebar 101 consistent with the braking rotation 105) and may move one or more brake pads, or otherwise actuate an existing brake system of the bicycle to reduce the speed of the bicycle.

The handle bar 101 may rotate inside the stem 103 via the bearings 109. For example, the bearings 109 maybe attached, installed, or otherwise operationally coupled to the handlebar 101 so that when the handlebar 101 is rotated, the bearings 109 may also consistently rotate. The bearings 109 may be connected to the handle bar 101 via the bearing inner race 108, such as a depressed or etched region, within the handlebar 101, matching the shape and size of the bearings 109 inner diameter. Similarity, the stem 103 may also house the bearing outer races 104. These components may constrain relative motion of the handlebar 101 to only the desired motion, and may reduce friction between the handle bar 101 and the stem 103. The bearing system disclosed above may also provide free rotational movement of the handle bar 101 around a fixed axis. In some embodiments, the braking system 100 may use a bushing mechanism instead (or it in addition to) the bearing system described above. A bushing, also known as a bush, is an independent plain bearing that is inserted into a housing to provide a bearing surface for rotary applications. In a non-limiting example a lever is used to translate the rotary force (e.g., the force applied to the handlebar 101) to a linear force and actuate the brake cables 107.

Handlebar 101 may also comprise a bar stop 110. The bar stop 110 may be a tab or otherwise a protrusion that is attached with or otherwise operationally coupled with the handlebar 101, as shown in the braking system 100. The bar stop 110 may come to rest against its counterpart a tab or otherwise a protrusion that is attached with or otherwise operationally coupled with the faceplate 111 or stem 103, as shown in the braking system 100. The bar stop 110 may rotate the same amounts as the handlebar 101. For instance, the speed and the rotational amount of movement of bar stop 110 may be directly proportional to the speed and the rotational amount of the handlebar 101. In some other embodiments, the speed and the rotational amount of the bar stop 110 may not be directly proportional to the speed and the rotational amount of the handlebar 101. In some configurations, bar stop 110 may rotate at a speed or by an amount that is not equal to the handlebar 101. Furthermore, the rotation of the bar stop 110 may also be restricted by the stem face 111 or stem 103. For example, upper and lower portions of the stem face 111 may dictate how much the bar stop 110 can rotate in clockwise and/or counterclockwise directions. The bar stop 110 ensures that the handlebar 101 does not rotate beyond a predetermined rotational range. In some configurations, the predetermined rotational range of the handle bar 101 may be adjustable by the operator via adjusting a corresponding stop in the stem faceplate 111 or stem 103.

Figure 2:
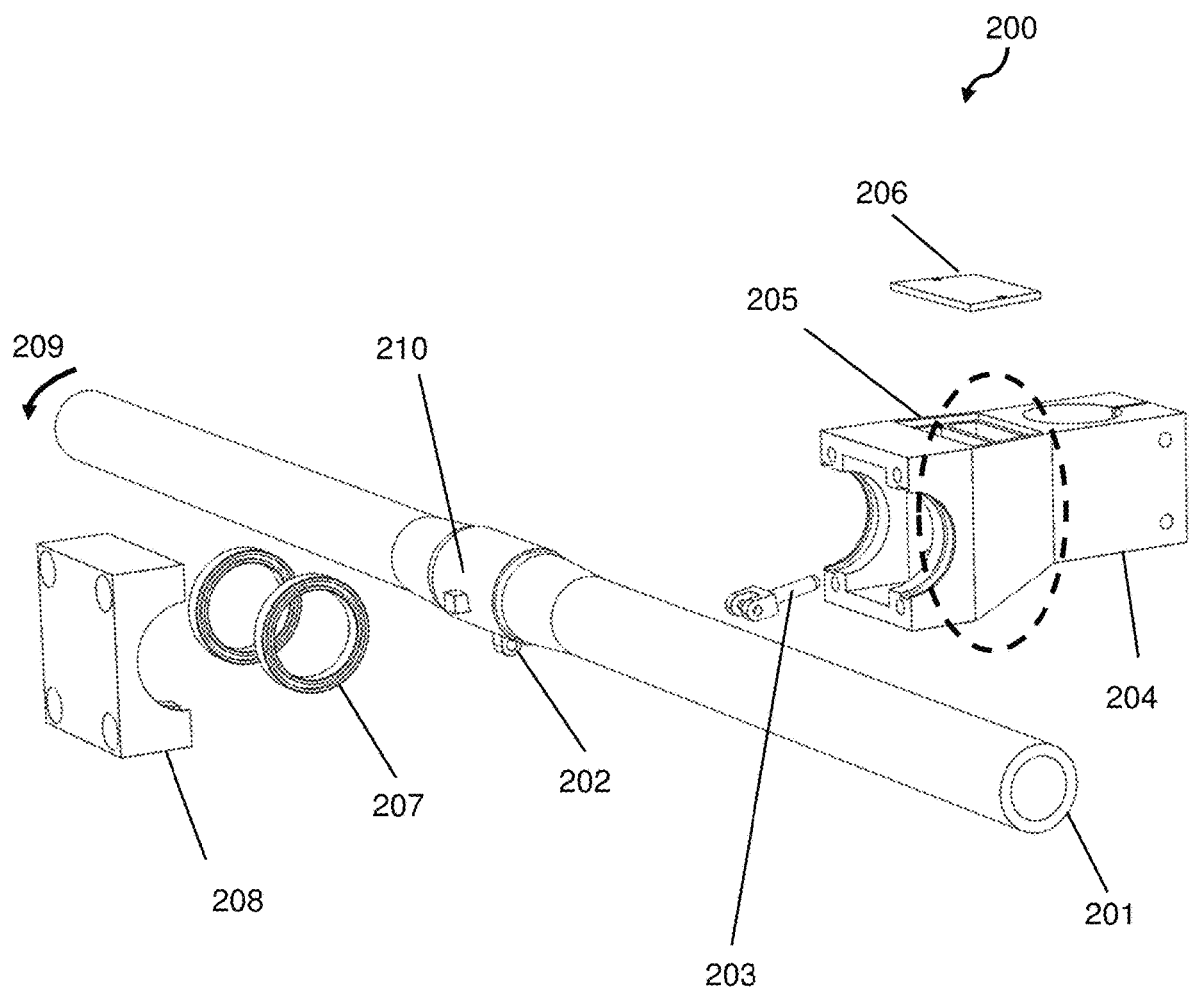
FIG. 2 illustrates an exploded view of an embodiment (second) a rotational hand brake according this disclosure.

FIG. 2 illustrates an exploded view of a rotational hand brake, in accordance with an embodiment. FIG. 2 illustrates the operational steps for actuating a braking system 200, using hydraulic force, in accordance with an embodiment. As illustrated in FIG. 2 braking system 200 may include handle bar 201, push rod mount 202, push rod 203, stem 204 with master cylinder with internal fluid reservoir 205, reservoir cover 206, bearings 207, stem face plate 208, braking rotation 209, and bar stop 210.

In operation, and using a non-limiting example, an operator (e.g., a rider) may use one or more components described in FIG. 2 to actuate a hydraulic braking system of a bicycle or another vehicle. For instance, a rider may rotate the handlebar 201, in the direction of the braking rotation 209, thereby rotating the pushrod mount 202 in a rotational manner consistent with the braking rotation 209. The pushrod mount 202 may be a tab or a protrusion that is attached with or otherwise operationally coupled with the handlebar 201 and the pushrod 203, as shown in the braking system 200. The pushrod mount 202 may rotate the same amounts as the handlebar 201. For instance, the speed and the rotational amount of movement of pushrod mount 202 may be directly proportional to the speed and the rotational amount of the handlebar 201. In some other embodiments, the speed and the rotational amount of the pushrod mount 202 may not be directly proportional to the speed and the rotational amount of the handlebar 201. In some configurations, pushrod mount 202 may rotate at a speed or by an amount that is not equal to the handlebar 201.

Handlebar 201 may also comprise a bar stop 210. The bar stop 210 may be a tab or otherwise a protrusion that is attached with or otherwise operationally coupled with the handlebar 201, as shown in the braking system 200. The bar stop 210 may come to rest against its counterpart a tab or otherwise a protrusion that is attached with or otherwise operationally coupled with the stem face plate 208 or stem 204, as shown in the braking system 200. The bar stop 210 may rotate the same amounts as the handlebar 201. For instance, the speed and the rotational amount of movement of bar stop 210 may be directly proportional to the speed and the rotational amount of the handlebar 201. In some other embodiments, the speed and the rotational amount of the bar stop 210 may not be directly proportional to the speed and the rotational amount of the handlebar 201. In some configurations, bar stop 210 may rotate at a speed or by an amount that is not equal to the handlebar 201. Furthermore, the rotation of the bar stop 210 may also be restricted by the stem face 208. For example, upper and lower portions of the stem face plate 208 may dictate how much the bar stop 210 can rotate in clockwise and/or counterclockwise directions. The bar stop 210 ensures that the handlebar 201 does not rotate beyond a predetermined rotational range. In some configurations, the predetermined rotational range of the handle bar 201 may be adjustable by the operator via adjusting a corresponding stop in the stem faceplate 208. The handlebar 201 may also comprise a bearing 207, which allows the handlebar 201 to freely rotate along a predetermined axis, as described in FIG. 2.

Figure 3:
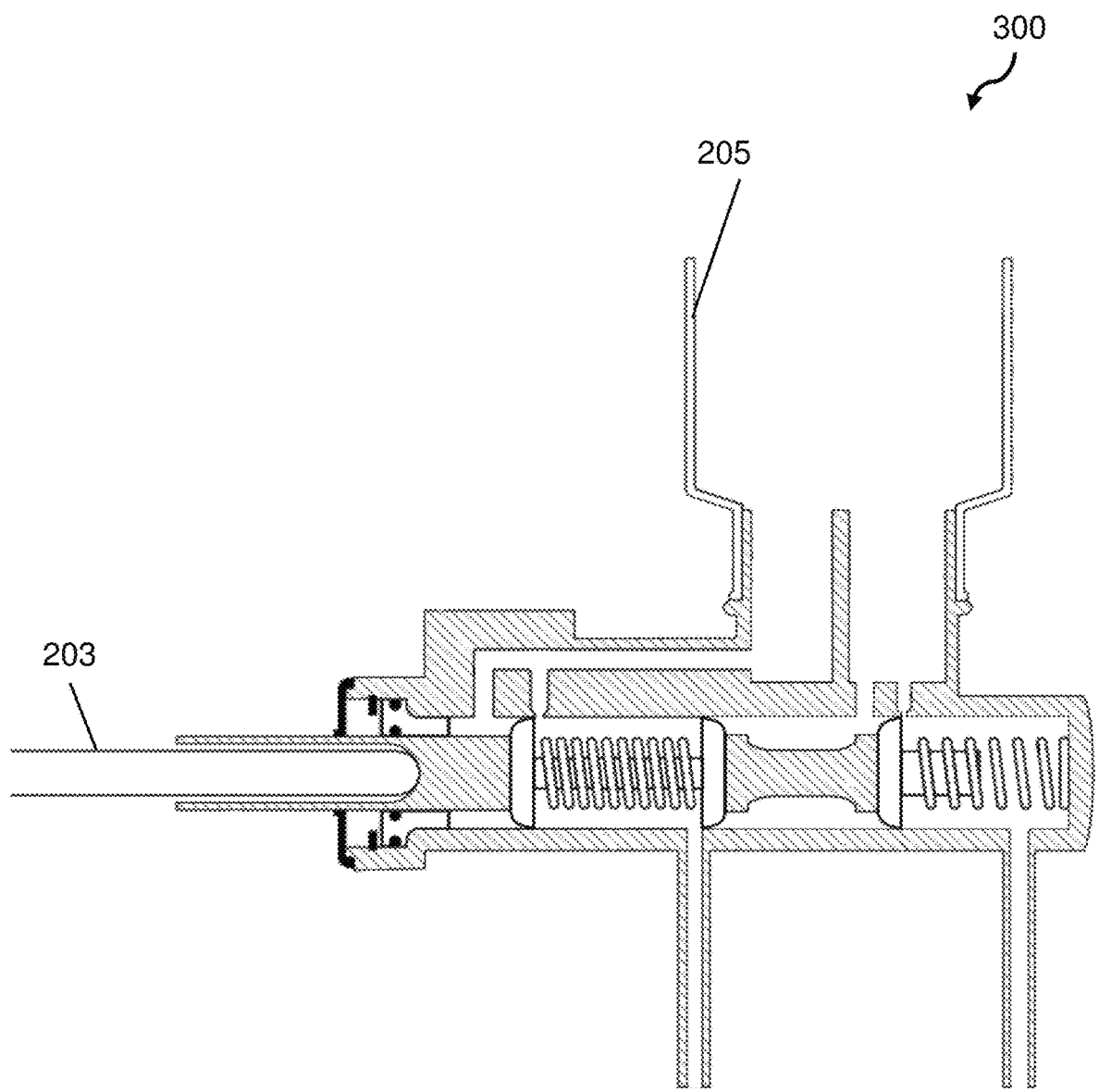
FIG. 3 illustrates a horizontal cross-sectional view of an embodiment of an internal fluid reservoir for a hydraulic braking system according this disclosure.

When the handlebar 201 is moved consistent with the braking rotation 209, the pushrod mount 202 is also moved consistent with the movement of handlebar 201. As a result, the pushrod 203 is moved. The pushrod 203 then actuates the bicycle's hydraulic braking system to reduce the speed of the bicycle. The hydraulic system, in some embodiments, may include a master cylinder with an internal fluid reservoir 205, which may be housed within the stem 204. The internal fluid reservoir 205 may also have a reservoir cover 206. The master cylinder with the internal fluid reservoir 205 is further described in FIG. 3 showing an embodiment 300. In some configurations, the embodiment 300 has the master cylinder with internal fluid reservoir, as depicted in FIG. 3, may be a part of an auxiliary and/or an external braking system. For instance, the master cylinder and internal fluid reservoir (or any other part of the hydraulic braking system) may be housed within the stem 204. However, in some other configurations, the master cylinder and/or internal fluid reservoir (or any other part of the hydraulic braking system) may be housed externally within or fixed to other parts of the bicycle. In those configurations, the braking system 200 may activate the external and/or auxiliary hydraulic braking system via a pushrod, cable, or other linkage in order to reduce the bicycle's speed.

In some embodiments, the master cylinder with internal fluid reservoir 205 may be a part of the bicycle's existing hydraulic braking system. A hydraulic braking system is an arrangement of braking mechanism, which uses brake fluid, contained within the fluid reservoir 205 and brake lines, to transfer or exert force to one or more brake pads, or other braking mechanisms to reduce the bicycle's speed. The hydraulic braking system may be actuated when the pushrod 203 is moved. Therefore, as described above, a rider can actuate an existing hydraulic braking system of a bicycle by rotationally moving the handlebars 201, which in turn actuate the pushrod mount 202, which in turn actuates the pushrod 203 cable or other linkage, which in turn actuates the master cylinder and/or the rest of the hydraulic braking system.

As described above, the master cylinder with internal fluid reservoir may be housed within the stem 204 or any other part of the bicycle (e.g., external hydraulic braking system). In either embodiment the braking system 200 may use a pushrod, such as pushrod 203 for internal hydraulic braking systems, or other pushrods or cables for external hydraulic braking components to actuate the hydraulic braking system.

In some configurations, braking system 100 and/or braking system 200 may be combined with other existing braking systems of a bicycle. For example, a bicycle may have a pedal rear brake in conjunction with the braking systems described above as the front brake system. Combining different braking systems may be beneficial, for example, for children as they have the leg strength to brake pedals that only work the rear wheel but insufficient finger strength to actuate a conventional front brake lever. The braking systems described herein may also be incorporated into other braking systems, such as pushrod braking systems. For instance, the braking systems described above can be used to exert force on a plate or pad, which then in turn exerts force onto a tire of a bicycle to create braking resistance. In another example, the braking systems described above can be used to exert force onto a brake pad that is pulled against an inner, side or outer surface of a rim of a front or rear wheel to create braking resistance.

Figure 8A:
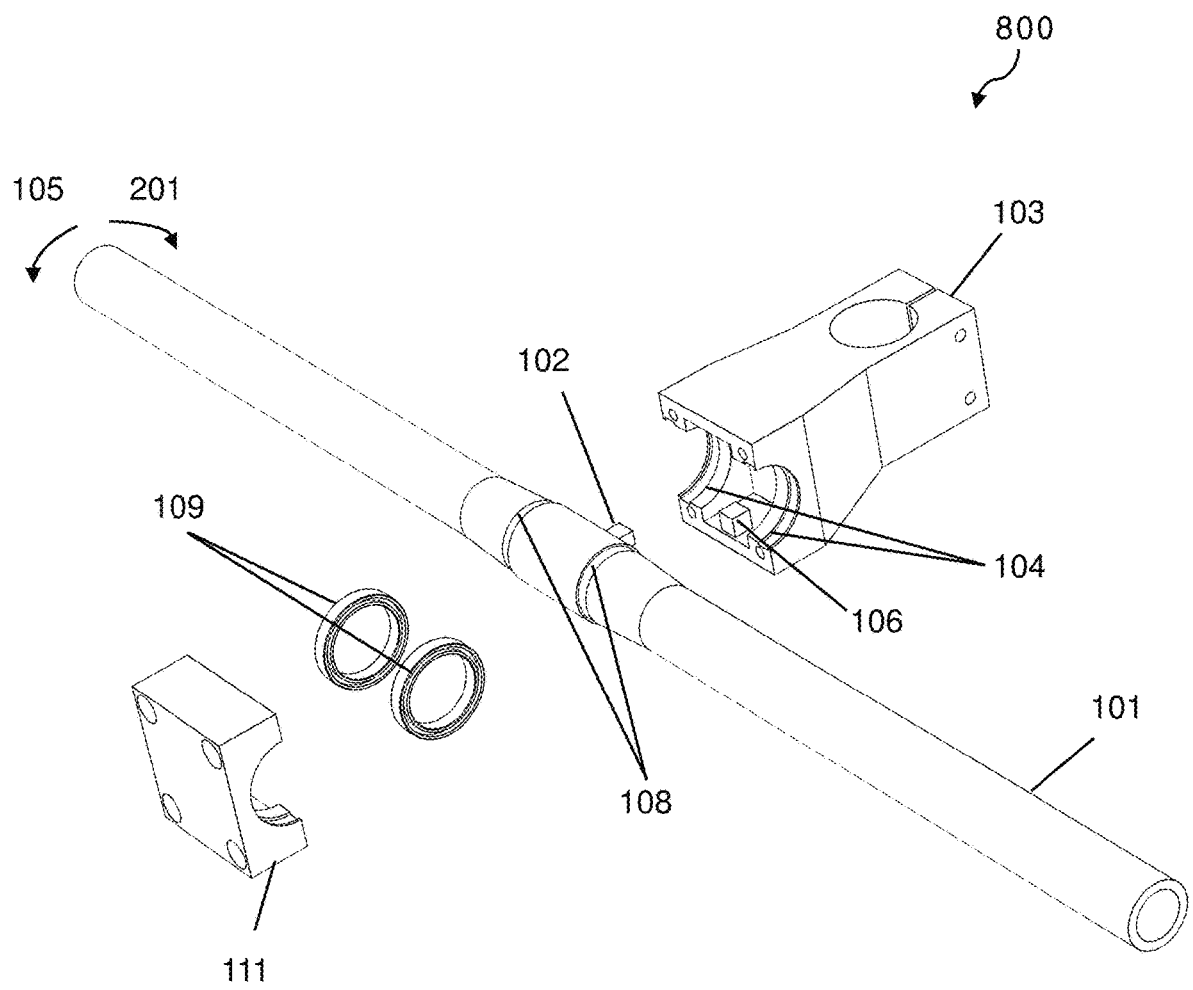
FIG. 8A illustrates an exploded view of an embodiment (seventh) of a rotational hand brake for a vehicle according this disclosure.
Figure 8B:
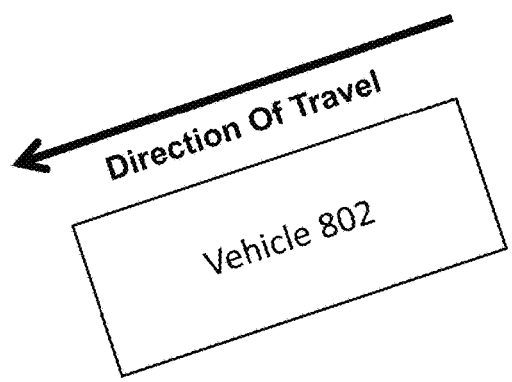
FIG. 8B illustrates a schematic view of an embodiment of a direction of travel of a vehicle according to this disclosure.

The braking systems described herein may also be used for pedal-less bicycles (e.g., kick bikes), as shown in an embodiment 800 depicted in FIG. 8B in view of what is disclosed herein. Using the braking systems described herein, children may learn to brake before they learn to pedal/propel themselves. This method of instruction is especially valuable because currently, children have to learn to brake as well as pedal at the same time, which is overwhelming in a learning sense.

The braking systems described herein may be incorporated into a retroactive kit including different components and parts described herein. Upon purchase of the retroactive kit, a user may install the braking systems described herein. In some configurations, the retroactive kit may be used in conjunction with a bicycle's existing braking system. In some other configurations, the retroactive kit may be used as a replacement to a bicycles braking system.

Figure 4A:
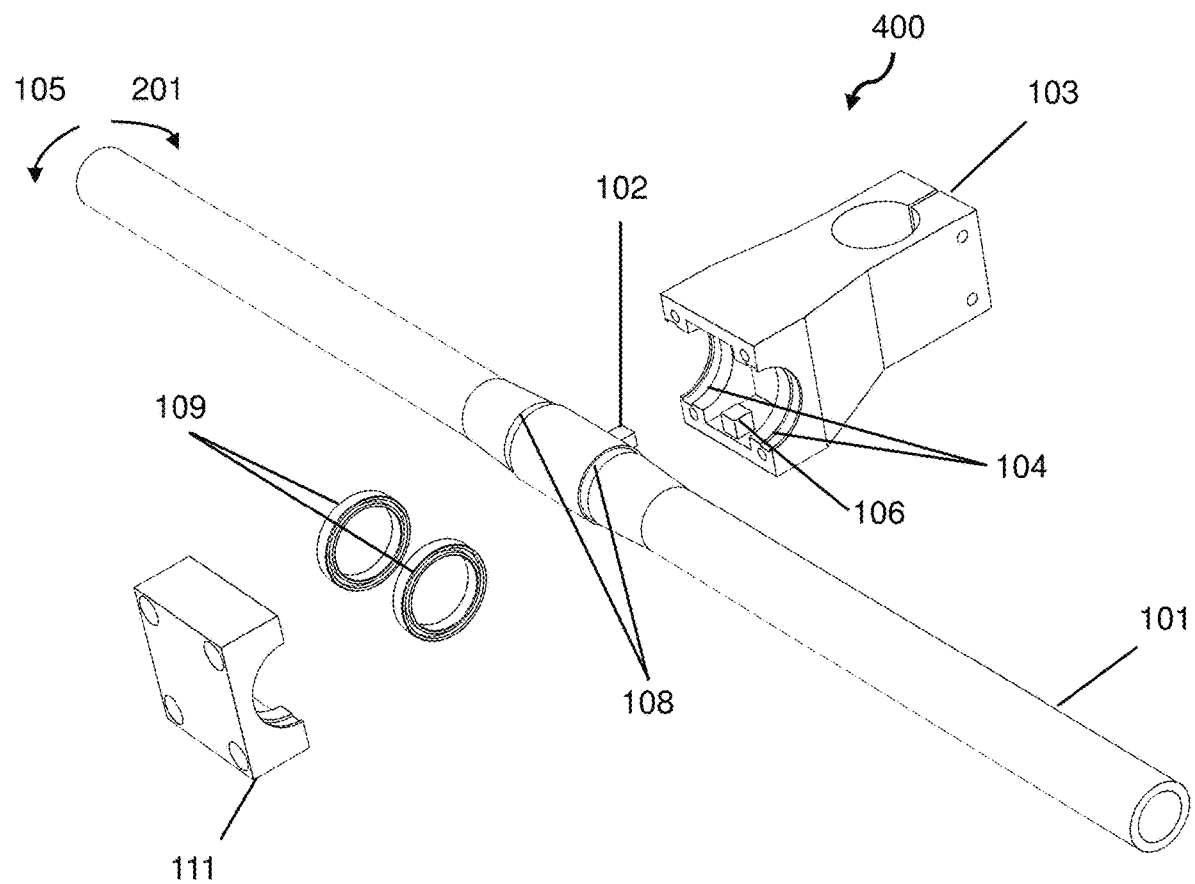
FIG. 4A illustrates an exploded view of an embodiment (third) of a rotational hand brake according this disclosure.
Figure 4B:
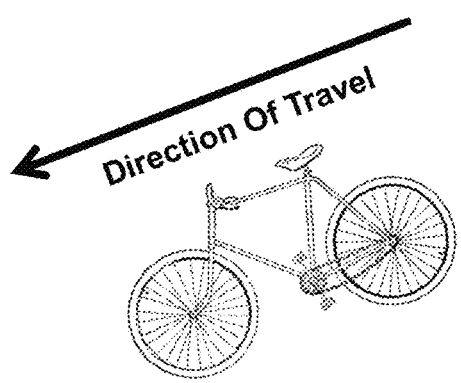
FIG. 4B illustrates a schematic view of an embodiment of a direction of travel of a vehicle according to this disclosure.

FIG. 4 illustrates an exploded view of a rotational hand brake, in accordance with an embodiment. In particular, a rotational hand brake 400 can be similar to the braking system 100 or 200. As such, the rotational hand brake 400 includes the handlebar 101, the stem 103, the bearing outer race 104, the direction of the braking rotation 105, the bearing inner race 108, the bearing 109 (e.g. bushings), and the stem face plate 111. However, the rotational hand brake system 400 includes, whether additionally or alternatively, a bar position sensor 102, a stem position sensor 106, and the direction of rotation for accelerating 201.

As shown in FIG. 4, there are two position type sensors (102 and 106) that are electronically powered (e.g., on-board battery). For example, these sensors can detect a movement of an object in a straight line (e.g., linear sensor) or by its angular movement using (e.g., rotational sensor). For example, these sensors can include a capacitive displacement sensor, eddy-current sensor, hall effect sensor, inductive sensor, laser doppler vibrometer (optical), linear variable differential transformer (LVDT), photodiode array, piezo-electric transducer (piezo-electric), position encoders, absolute encoder, incremental encoder, linear encoder, rotary encoder, potentiometer, proximity sensor (optical), string potentiometer (also known as string pot., string encoder, cable position transducer, ultrasonic sensor, or others. Note that the sensors have an identical or non-identical modality of operation.

The handlebar 101 externally hosts one of sensors and the stem 103 internally hosts the other sensor. These sensors (e.g., wireless beacons or transceivers, distance sensors, proximity sensors, paired sensors) inform a computer/controller of a personal transportation vehicle 802 (e.g. motorcycle, bicycle, scooter, electronic bicycle), as shown in an embodiment 800 depicted in FIG. 8B in view of what is disclosed herein. For example, the computer/controller can be or can avoid being hosted internal or external or local or remote to the handlebar 101 or the stem 103. When these sensors are closest together (e.g., at or less than 10 degrees, at or less than about 1 inch), then these sensors are in a "neutral" position (e.g., vehicle can move). However, when these sensors are moving apart in distance (both directions) then such movement can create differing effect. For example, if a user (e.g. cyclist, rider) rotates the handlebar 101 forward or in the direction 105 thereby increasing the distance between the sensors (102 and 106), then such rotation can proportionally increase the amount of regenerative braking in an electric motor of the vehicle thus recharging a battery of the vehicle. For example, the sensors (102 and 106) can sense each other in terms of distance or angle (e.g., wireless, radio, optical, acoustic signal). This could work in combination with a traditional cable or hydraulically activated brake. Further, rotating the handlebar 101 in the direction 105 can also inform an electrically activated brake caliper (or similar braking mechanism) via a wire. Further, rotating the handlebar 101 rearward or in the direction 201 can act like a traditional motorcycle accelerator—where the right hand grip rotates rearward to accelerate the bike (e.g., operably coupled to motor). For example, a mover (e.g., motor, engine, turbine) in communication with the computer/controller can be accelerated based on the handlebar 101 being rotated rearward or in the direction 201. Moreover, these sensors (102 and 106) could also be used as part of a traction control system on the vehicle by only allowing a limited amount of braking or accelerating power based on an algorithm using steering/handlebar angle and/or bicycle lean angle, speed and other environmental conditions as a typical traction control system would.

Figure 5:
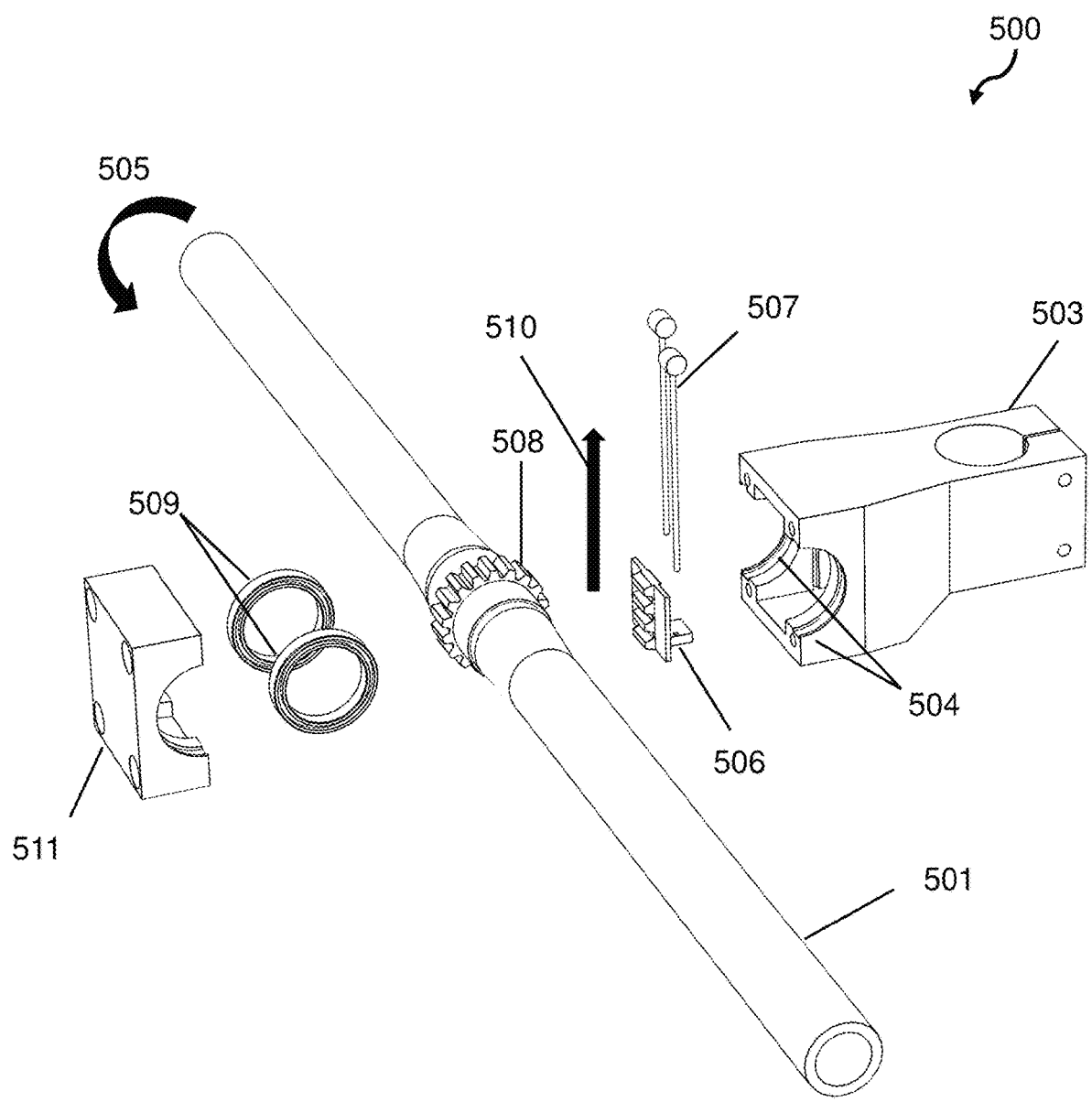
FIG. 5 illustrates an exploded view of an embodiment (fourth) of a rotational hand brake according this disclosure.

FIG. 5 illustrates an exploded view of an embodiment of a rotational hand brake according to this disclosure. A rotational hand brake 500 is a further non-limiting embodiment of the hand brake described herein. In this exemplary embodiment, the rotational hand brake 500 includes a handlebar 501, a stem 503, a bearing outer race 504, a braking rotation 505, a movable rack 506, a set of braking cables 507, a circular gear 508, a set of bearings 509, a rack direction 510, and a stem face plate 511. The handlebar 501 has the circular gear 508 radially extending therefrom or otherwise being coupled thereto. The rack 506 meshes with the circular gear 508 based on the handlebar 501 being rotated according to the braking rotation 505.

As a non-limiting example, a rider may rotate the handlebar 501 in the direction of the braking rotation 505. Rotation of the handlebar 501 about its longitudinal axis activates braking by moving the movable rack 506 in or along the same direction as the braking rotation 505 or vertically, which, in turn, causes the braking cables 507 to move in along with the movable rack 506. In some configurations, the movable rack 506 includes one or more openings (e.g., holes) that correspond to brake cables 507. For example, brake cables 507 may penetrate the movable rack 506 in accordance with the one or more openings.

The disclosure also provides methods for actuating a brake for a personal transportation vehicle. As a non-limiting example, the methods comprise moving handlebar 501 in the braking rotation 505, wherein rotating the handle bar 501 also moves gear 508 in the braking rotation 505. The methods further include actuating a hydraulic piston by moving the movable rack 506 in the rack direction 510 causing movement of brakes 507 in the rack direction 510. In an exemplary embodiment, the brakes 507 are pulled in the rack direction 510 to actuate a hydraulic piston. In an alternative embodiment, the hydraulic piston is actuated when the rack 506 links to a pushrod or a plunger.

Figure 6:
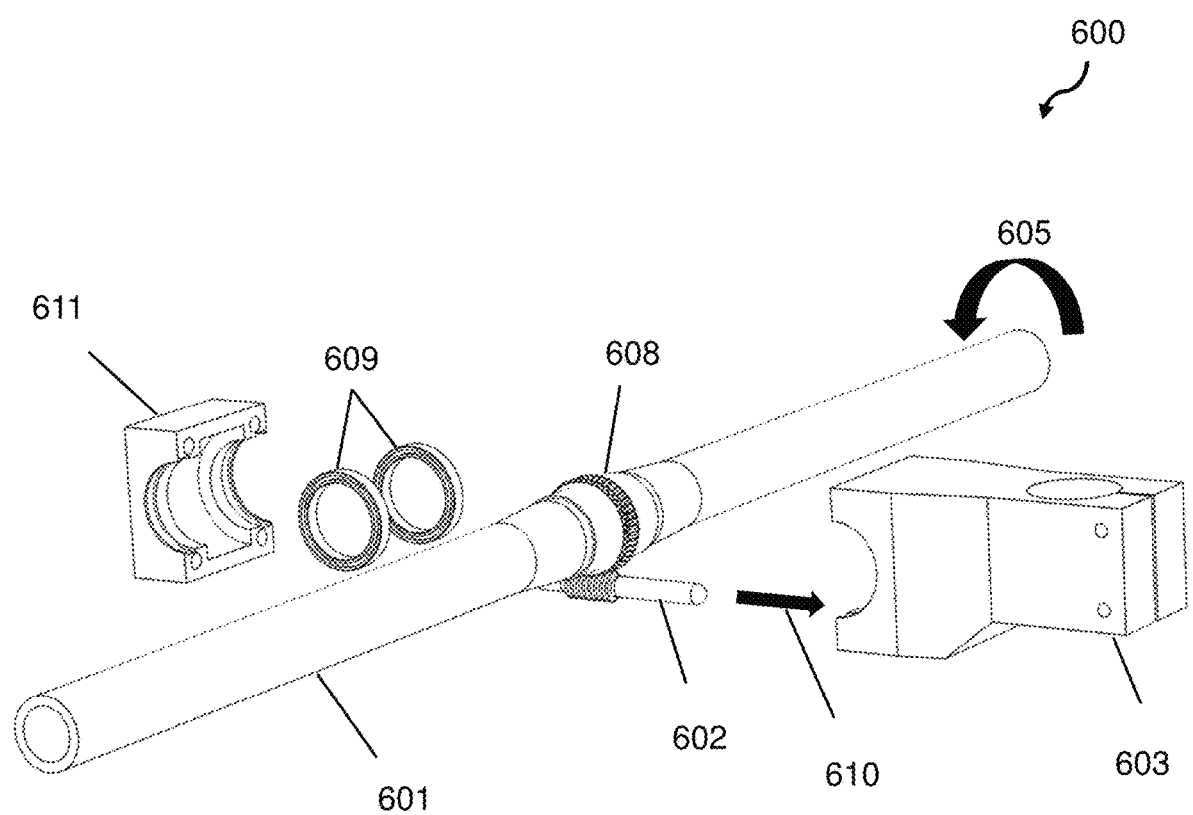
FIG. 6 illustrates an exploded view of an embodiment (fifth) of a rotational hand brake according this disclosure.

FIG. 6 illustrates an exploded view of an embodiment of a rotational hand brake according to this disclosure. A rotational hand brake 600 is a non-limiting embodiment of the hand brake described herein. In this exemplary embodiment, the rotational hand brake 600 includes a handlebar 601, a worm gear 602, a stem 603, a braking rotation 605, a circular gear 608 (or another form of spur gear), a set of bearings 609, and a stem face plate 611. The handlebar 601 has the circular gear 608 radially extending therefrom or otherwise being coupled thereto. The worm gear 602 meshes with the circular gear 608 based on the handlebar 601 being rotated according to the braking rotation 605.

In operation, and using a non-limiting example, an operator (e.g., a rider) may use one or more components described in FIG. 6 to actuate a hydraulic braking system of a personal transportation vehicle. In exemplary embodiments, a rider rotates the worm gear 602 in a rotational manner consistent with the braking rotation 605. The worm gear 602 may be a tab or a protrusion that is attached with or otherwise operationally coupled with the handlebar 601 and the stem 603.

The speed and rotational amount of movement of the worm gear 602 is optionally proportional to the speed and rotational amount of the handlebar 601. In some embodiments, the speed and the rotational amount of the worm gear 602 is not directly proportional to the speed and rotational amount of the handlebar 601.

When the handlebar 601 is moved consistent with the braking rotation 605, the worm gear 602 is also moved consistent with the movement of the handlebar 601. As a result the worm gear 602 actuates the personal transportation vehicle's hydraulic (or cabling, pneumatic, or electric) braking system to reduce the speed of the vehicle. In exemplary embodiments, the hydraulic braking system includes a master cylinder with an internal fluid reservoir, such as the one illustrated in FIG. 2, which may be housed in the stem 603. The internal fluid reservoir 205 may also have a reservoir cover 206.

In an alternative embodiment, the methods for actuating a brake for a personal transportation vehicle comprise moving the handle bar 601 and the gear 608 in the rotational direction 605. Rotation of the gear 608 moves the worm gear 602 in the direction 610. In one embodiment, moving the pushrod mount 602 in the direction 610 actuates a hydraulic brake (e.g. via a cable). In an alternative embodiment, moving the worm gear 602 in the direction 610 couples the worm gear 602 with a brake cable to actuate a mechanical brake (e.g., via a cable).

Figure 7:
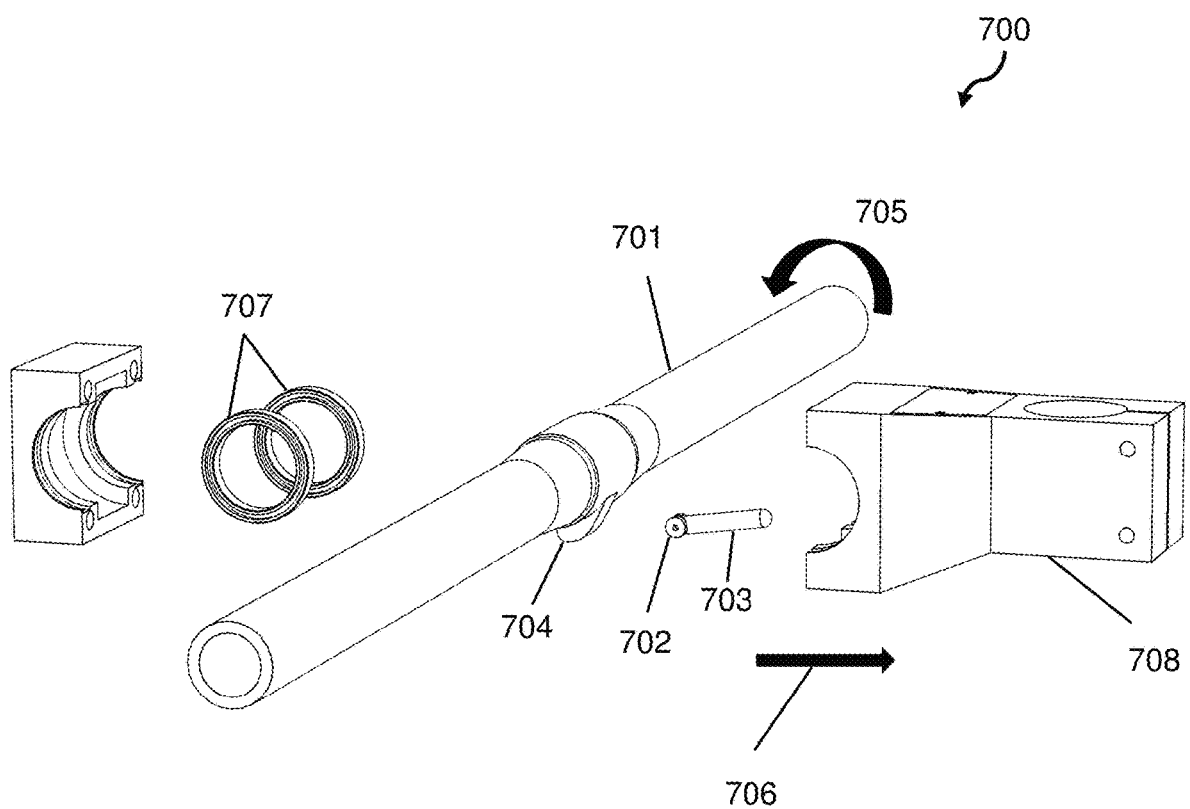
FIG. 7 illustrates an exploded view of an embodiment (sixth) of a rotational hand brake for a vehicle according this disclosure.

FIG. 7 illustrates an exploded view of a rotational hand brake, in accordance with an embodiment. A rotational hand brake 700 is a non-limiting embodiment of the hand brake described herein. In this exemplary embodiment, the rotational hand brake 700 includes a handlebar 701, a rotational direction 705, a cam 704, a cam follower 702, a rod 703, a direction 706, a set of bearings 707, and a stem 708. The handlebar 701 has the cam 704 radially extending therefrom or otherwise being coupled thereto. The rod 703 is connected or secured to the cam follower 702, which follows or interfaces with the cam 704.

In operation, and using a non-limiting example, an operator (e.g., a rider) may use one or more components described in FIG. 7 to actuate a hydraulic (or cabling, pneumatic, or electric) braking system or a mechanical brake of a personal transportation vehicle. In exemplary embodiments, a rider rotates the handlebar 701 in a rotational manner consistent with the braking rotation 705. The cam 704 may be a tab or a protrusion that is attached with or otherwise operationally coupled with or extending from the handlebar 701.

The disclosure provides an exemplary method for actuating a brake for a personal transportation vehicle comprise moving the handlebar 701 in the rotational direction 705. Rotation of the handle bar 701 also moves the cam 704. In exemplary embodiments, the cam 704 progressively moves towards cam follower 702 and the cam follower rod 703 in the direction 706. The brake is actuated by moving the cam follower 702 and the cam follower rod 703 toward the stem 708. In some embodiments, the brake is a hydraulic brake. In alternative embodiments, the brake is a mechanical and/or cable brake.

In this disclosure, the corresponding structures, materials, acts, and equivalents of all means or step plus function elements in the claims below, if any, are intended to include any structure, material, or act for performing the function in combination with other claimed elements as specifically claimed. Note that the scope of the present disclosure is defined by the claims, which includes known equivalents and unforeseeable equivalents at the time of filing of the present disclosure. This disclosure has been presented for purposes of illustration and description, but is not intended to be fully exhaustive and/or limited to the disclosure in the form disclosed. Many modifications and variations in techniques and structures will be apparent to those of ordinary skill in the art without departing from the scope and spirit of the disclosure as set forth in the claims that follow. Accordingly, such modifications and variations are contemplated as being a part of the present disclosure.

What is claimed is:

1. A device comprising:
    a handlebar having a longitudinal axis;
    a circular gear radially extending from the handlebar;
    a stem engaging the handlebar such that the handlebar rotates about the longitudinal axis relative to the stem;
    a rack extending between the circular gear and the stem, wherein the rack is configured to mesh with the circular gear; and
    a brake operationally coupled to the rack, wherein the brake is configured to be actuated based on the circular gear rotating via the handlebar and causing the rack to move.

2. The device of claim 1, further comprising a bicycle having the handlebar, the circular gear, the stem, the rack, and the brake.

3. The device of claim 2, wherein the bicycle is a child kick bicycle without any pedals and any brake levers.

4. The device of claim 1, further comprising a motorcycle having the handlebar, the circular gear, the stem, the rack, and the brake.

5. The device of claim 1, further comprising a scooter having the handlebar, the circular gear, the stem, the rack, and the brake.

6. The device of claim 1, further comprising a vehicle having the handlebar, the circular gear, the stem, the rack, the brake, and a front wheel engageable by the brake.

7. The device of claim 1, further comprising a vehicle having the handlebar, the circular gear, the stem, the rack, the brake, and a rear wheel engageable by the brake.

8. The device of claim 1, wherein the handlebar rotates about the longitudinal axis relative to the stem in a forward moving direction.

9. The device of claim 1, further comprising a cable configured to move along with the rack to enable the brake to be actuated.

10. The device of claim 9, wherein the rack has an opening through which the cable extends.

11. A device comprising:
    a handlebar having a longitudinal axis;
    a cam radially extending from the handlebar;
    a cam follower configured to engage the cam;
    a rod extending from the cam follower;
    a stem engaging the handlebar such that the handlebar rotates about the longitudinal axis relative to the stem; and
    a brake configured to be actuated in response to the cam follower or the rod configured to engage a braking mechanism housed in or operably connected to the stem based on the cam moving via the handlebar.

12. The device of claim 11, further comprising a bicycle having the handlebar, the cam, the cam follower, the rod, the stem, and the brake.

13. The device of claim 12, wherein the bicycle is a child kick bicycle without any pedals and any brake levers.

14. The device of claim 11, further comprising a motorcycle having the handlebar, the cam, the cam follower, the rod, the stem, and the brake.

15. The device of claim 11, further comprising a scooter having the handlebar, the cam, the cam follower, the rod, the stem, and the brake.

16. The device of claim 11, further comprising a vehicle having the handlebar, the cam, the cam follower, the rod, the stem, the brake, and a front wheel engageable by the brake.

17. The device of claim 11, further comprising a vehicle having the handlebar, the cam, the cam follower, the rod, the stem, the brake, and a rear wheel engageable by the brake.

18. The device of claim 11, further comprising a rod connected or secured to the cam follower.

19. The device of claim 11, wherein the brake is configured to be actuated in response to the cam follower configured to engage the braking mechanism housed in or operably connected to the stem based on the cam moving via the handlebar.

20. The device of claim 11, wherein the brake is configured to be actuated in response to the rod configured to engage the braking mechanism housed in or operably connected to the stem based on the cam moving via the handlebar.

* * * * *